(12) United States Patent
Venkatachalam

(10) Patent No.: US 8,064,928 B2
(45) Date of Patent: Nov. 22, 2011

(54) SYSTEM AND METHOD FOR PROVIDING LOCATION BASED SERVICES (LBS) TO ROAMING SUBSCRIBERS IN A WIRELESS ACCESS NETWORK

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 12/201,048

(22) Filed: Aug. 29, 2008

(65) Prior Publication Data

US 2010/0056182 A1   Mar. 4, 2010

(51) Int. Cl.
H04W 24/00   (2009.01)
(52) U.S. Cl. ............. 455/456.3; 455/456.1; 455/456.2
(58) Field of Classification Search ......... 455/456.1, 455/456.2, 456.3
See application file for complete search history.

(56) References Cited

U.S. PATENT DOCUMENTS

| | | | |
|---|---|---|---|
| 2005/0113114 A1* | 5/2005 | Asthana | 455/456.3 |
| 2005/0232189 A1 | 10/2005 | Loushine | |
| 2006/0035646 A1 | 2/2006 | Fox et al. | |
| 2006/0058042 A1* | 3/2006 | Shim | 455/456.3 |
| 2009/0022858 A1 | 1/2009 | Pawlick | |

FOREIGN PATENT DOCUMENTS

| | | |
|---|---|---|
| WO | WO-2010/025036 A2 | 3/2010 |
| WO | WO-2010025036 A3 | 5/2010 |

OTHER PUBLICATIONS

"International Application Serial No. PCT/US2009/053530, Search Report mailed Mar. 17, 2010", 7 pgs.
"International Application Serial No. PCT/US2009/053530, Written Opinion mailed Mar. 17, 2010", 5 pgs.
"MSF Architecture for WiMAX Access Netwolrk Tile", MSFR4-ARCH-WIMAX-FINAL MUTISERVICE FORUM, http://www.msforum.org/techinfo/approved/MSFR4-Arch-WIMAX-FINAL.pdf, (Jul. 9, 2008), 19-2 1.
Rongmao, L., "The Current Status of LBS Technology Development under IEEE 802.16m System Technology", *TAIWAN : Industrial Technology Research Institute of Information & Communication*, http://www.communications.org.tw/search.php?keyword=LBS, (Mar. 10, 2009), pp. 2-4.

* cited by examiner

*Primary Examiner* — Nick Corsaro
*Assistant Examiner* — Amanuel Lebassi
(74) *Attorney, Agent, or Firm* — Schwegman, Lundberg & Woessner, P.A.; Gregory J. Gorrie

(57) ABSTRACT

Embodiments of a wireless access network and method for providing a location based service (LBS) to a visiting mobile station are disclosed. In some embodiments, a location data request forwarded by a home location server (HLS) is received at a visited location server (VLS). A subscriber profile and security query is generated for forwarding from a visitor authentication server to a home authentication server. When the home authentication server authenticates the request, location information for the visiting mobile station is obtained and a location data response message that includes the location information from the VLS is sent to the HLS for forwarding to the location client for use by the location client in performing a requested LBS.

20 Claims, 3 Drawing Sheets

SYSTEM AND METHOD FOR PROVIDING LOCATION BASED SERVICES (LBS) TO ROAMING SUBSCRIBERS IN A WIRELESS ACCESS NETWORK

TECHNICAL FIELD

Some embodiments pertain to wireless networks. Some embodiments pertain to providing location-based services (LBS) in broadband wireless access (BWA) networks, such as WiMax and LTE networks.

BACKGROUND

Location-Based Services (LBS) are information and entertainment services accessible by mobile stations through a wireless network that make use of the geographical position of the mobile station. Providing LBS in broadband wireless access networks, such as WiMax and LTE networks, becomes increasingly complex when mobile stations are roaming because, among other things, location-based service requests need to be authenticated and user policies from the home service network need to be applied.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
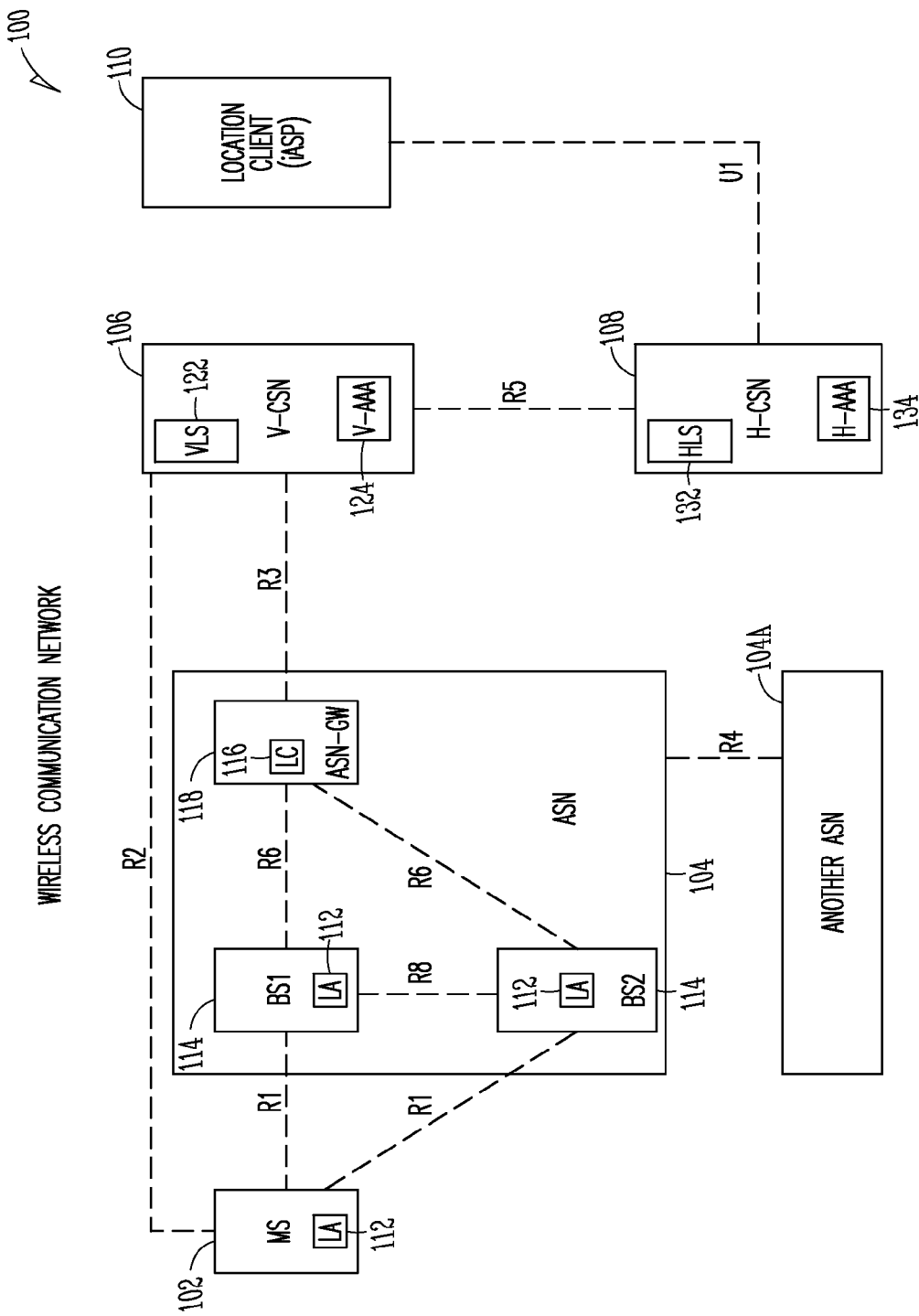
FIG. 1 illustrates a wireless communication network in accordance with some embodiments.

FIG. 1 illustrates a wireless communication network in accordance with some embodiments. Wireless communication network 100 includes one or more access service networks (ASNs) 104 and 104A and one or more core service networks (CSNs) 106 and 108. ASNs 104 and 104A communicate with a plurality of mobile stations, such as mobile station (MS) 102, using a wireless communication technique. Each CSN may be associated with one or more ASNs. In FIG. 1, CSN 106 is illustrated as being associated with ASNs 104 and 104A. Other ASNs (not illustrated) are associated with CSN 108. As illustrated in FIG. 1, CSN 108 may be a home CSN (H-CSN) for mobile station 102, and CSN 106 may be a visiting CSN (V-CSN) for mobile station 102 when mobile station 102 is roaming (i.e., communicating with an ASN not associated with H-CSN 108.

Each ASN 104 may include a plurality of base stations (BS1 and BS2) 114 and an ASN gateway (GW), such as ASN-GW 118. Base stations 114 may communicate with mobile stations over an R1 interface. ASN gateway 118 may communicate with CSN 106 over an R3 interface. Within an ASN, base stations 114 may communicate with each other using an R8 protocol and may communicate with ASN gateway 118 using an R6 protocol. ASNs 104 and 104A may communicate with each other using an R4 protocol. CSNs 106 and 108 may communicate with each other over an R5 interface.

Mobile station 102 and base stations 114 may include location agents (LAs) 112. ASN gateway 118 may include location controller (LC) 116. V-CSN 106 may include visitor location server (VLS) 122 and visitor authentication, authorization and accounting AAA (V-AAA) server 124. H-CSN 108 may include home location server (HLS) 132 and home authentication, authorization and accounting AAA (H-AAA) server 134. In these embodiments, the R3 interface may be based on the Radius or Diameter protocols and may use an AAA protocol for security. The R4, R6 and R8 protocols may be a universal datagram protocol (UDP) based protocol with reusable message headers. As illustrated in FIG. 1, an R2 signaling protocol may be used for certain communications between CSN 106 and mobile station 102, however the actual signals may be transferred through ASN 104.

In accordance with some embodiments, mobile station 102 may request LBS through an application service provider (ASP) or an internet ASP (iASP) that may reside in location client 110. Location client 110 may communicate with H-CSN 108 of mobile station 102 over a U1 interface. The providing of LBS to roaming mobile stations is discussed in more detail below.

Location servers 122 and 132 are configured to provide the location of a mobile station, such as mobile station 102, to authorized entities internal or external to network 100. Location servers 122 and 132 trigger a network initiated LBS process based on external inquiries discussed below. To activate LBS for mobile station 102, home location server 132 may make a location data request to AAA server 134 of the associated CSN. When AAA server 134 authenticates the request, AAA server 134 may provide an anchor authenticator of mobile station 102 to location server 132. From the anchor authenticator, the location controller identifier is retrieved. Hence for an LBS-activated mobile station, the location server is able to obtain the ID of the location controller for the mobile station. In the example of FIG. 1, location server 122 is able to obtain the ID of location controller 116 even though mobile station 102 is roaming. Location servers 122 and 132 receive location information from location controller 116 in serving ASN 104.

In some embodiments, location controller 116 is configured to determine the location information of a mobile station when requested by location server 122. Location controller 116 may employ one or more techniques to determine the location of mobile station 102 using, device based methods, network based methods or a judicious mix of both. While using network based methods, location controller 116 may coordinate between base stations 114 that mobile station 102 may be communicating with to determine location or location parameters. Location controller 116 may provide the location or location parameters of mobile station 102 to location server 122. In some embodiments, location controller 116 may provide the location information directly to mobile station 102 on request. In some embodiments, on a request from mobile station 102, location controller 116 may trigger location related measurements and collect relevant data for location determination. Location controller 116 is configured to maintain the base station ID of the one or more base stations 114 serving mobile station 102 and provide the serving base station's identification information to location server 122. Location controller 116 may be configured to select a particular location determination technique (e.g., time difference of arrival (TDOA), round-trip delay (RTD), etc) and may trigger a location determination procedure based on the selected location algorithm. When mobile station 102 includes a standalone location determining capability, the operation of location controller 116 may be bypassed. These embodiments are described in more detail below.

Location agents 112 are configured to make location related measurements and/or collect and report location related information to location controller 116. Location agents 112 may reside entirely within base stations 114, however, location agents 112 may alternately reside within mobile station 102. In some embodiments, the functions of location agents 112 may reside within both mobile station 102 and base stations 114 as illustrated. When mobile station 102 includes location agent 112, it may communicate with a corresponding location agent 112 in base station 114.

When mobile station 102 is roaming, the location information for mobile station 102 may be provided in several ways. In some embodiments, a base station ID may be used as the location information. In some embodiments, triangulation may be used by several base stations 114. In these embodiments, VLS 122 may communicate with LC 116 to receive this location information. In some embodiments, the location information for mobile station 102 may be determined using satellite assistance including the use of a global positioning system (GPS) or assisted GPS (AGPS). In some situations, satellite assistance may be provided to mobile station 102 by VLS 122 based on a serving base station's ID.

When mobile station 102 requests a LBS, an ASP within location client 110 will need to obtain location information of mobile station 102 to provide the requested LBS. In accordance with embodiments, location data requests are authenticated, location information is obtained, and user policies are applied from H-CSN 108. These embodiments are discussed in more detail below.

As used herein, LBS include any information and entertainment services that make use of the geographical location of the requesting mobile station. In some embodiments, LBS may be used to identify the location of a person or object, such as discovering the nearest banking cash machine or the whereabouts of a friend or employee. LBS may include parcel tracking and vehicle tracking services, may include personalized weather services and may include location-based games. LBS may also include requesting the nearest business or service, a turn-by-turn navigation to an address, or locating people on a map displayed on a mobile station, receiving alerts, such as notification of a sale on gas or warning of a traffic jam. LBS may be used for taxis, service people, rental equipment, doctors, fleet scheduling, etc. LBS may also include the use of passive sensors or RF tags, such as packages and train boxcars. LBS may also include proximity-based notification and targeted advertising. LBS may be used for automatic airport check-in and payment based on proximity (e.g., EZ pass, toll watch). LBS may also include a public-safety answering point (PSAP) for emergency and public safety situations.

In some embodiments, ASNs 104 may communicate with mobile stations using a multicarrier wireless access communication technique, such as orthogonal frequency division multiple access (OFDMA), although the scope of the embodiments is not limited in this respect. OFDMA may use orthogonal frequency division multiplexed (OFDM) signals that may comprise a plurality of orthogonal subcarriers. In some embodiments, ASNs 104 may be part of a Worldwide Interoperability for Microwave Access (WiMax) communication network and mobile station 102 may be a WiMax mobile station, although the scope of the invention is not limited in this respect. In these WiMax embodiments, ASNs 104 may communicate with mobile stations in accordance with the Institute of Electrical and Electronics Engineers (IEEE) standards including the IEEE 802.16(e) and (m) standards for wireless metropolitan area networks (WMANs) including variations and evolutions thereof. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In other embodiments, ASNs 104 may be part of a Universal Terrestrial Radio Access Network (UTRAN) Long Term Evolution (LTE) (also known as 3GPP-LTE and E-UTRA) communication network and mobile station 102 may be an 3GPP-LTE mobile station. In these 3GPP-LTE embodiments, ASNs 104 may communicate with mobile stations in accordance with the 3rd Generation Partnership Project (3GPP) standards for UTRAN-LTE, release 8, March 2008, including variations and evolutions thereof. In some WiMax embodiments, both uplinks and downlinks may use OFDMA, while in some LTE embodiments, downlinks may use OFDMA while uplinks may use single-subcarrier frequency-division multiplexing (SC-FDM).

Mobile station 102 may be almost any portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Figure 2:
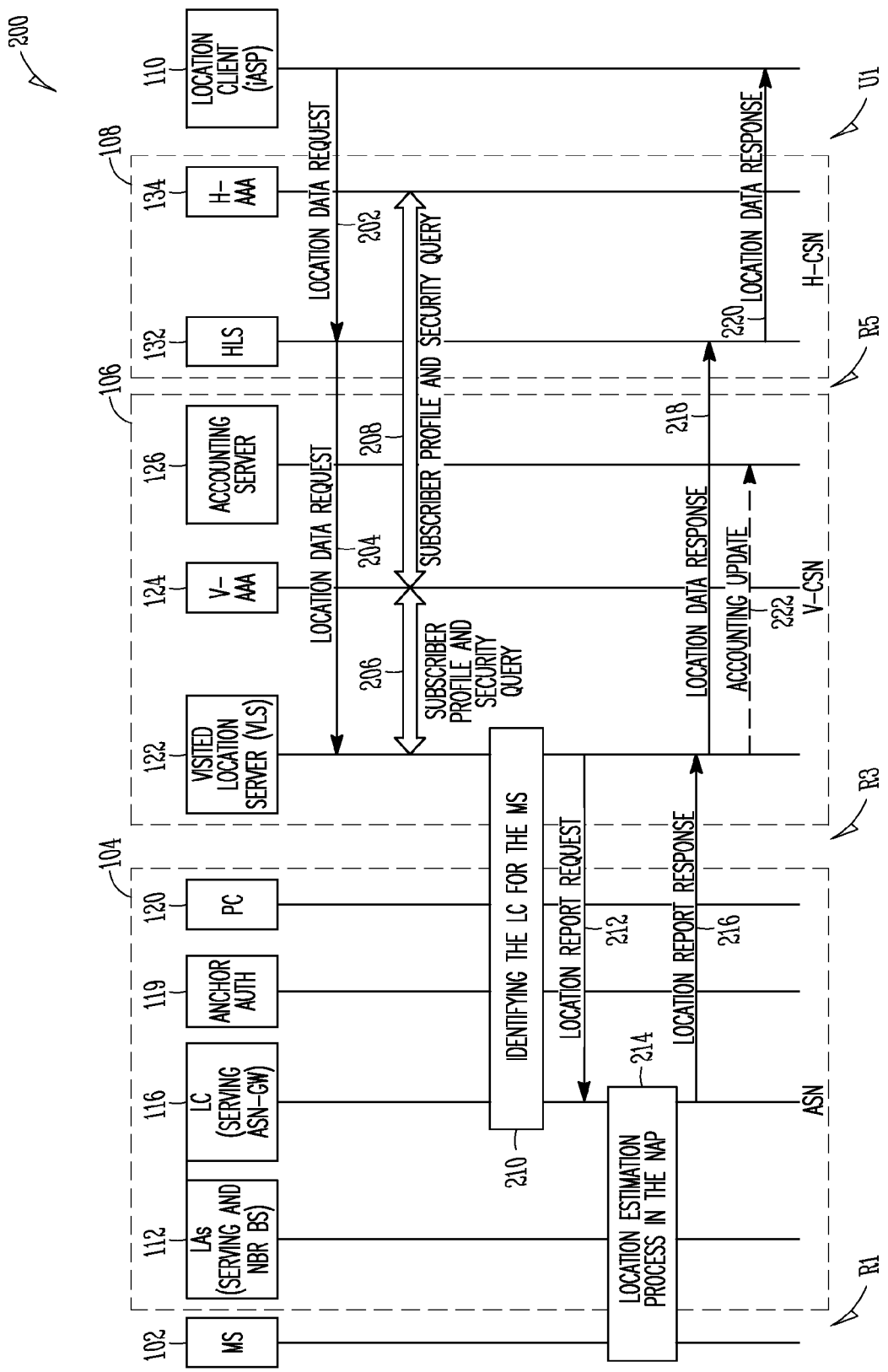
FIG. 2 illustrates a procedure for providing LBS when a mobile station is roaming in accordance with some embodiments.

FIG. 2 illustrates a procedure for providing LBS when a mobile station is roaming in accordance with some embodiments. In accordance with procedure 200, a request for LBS for a roaming mobile station is authenticated, location information for the roaming mobile station is determined and provided to the application service provider, and user policies from H-CSN 108 are applied to the services. In the embodiments illustrated in FIG. 2, mobile station 102 does not have or does not use a standalone location determining capability and a network-based location determining technique is used.

In accordance with some embodiments, location data request 202, originating from location client 110, is forwarded by HLS 132 as location data request 204 to VLS 122. A subscriber profile and security query 208 is generated for forwarding from V-AAA server 124 to H-AAA server 134 for authentication. When H-AAA server 134 authenticates the request, location information may be obtained for visiting mobile station 102 and location data response message 218 that includes the location information may be sent from VLS 122 to HLS 132 for forwarding to location client 110 for use by the location client 110 in performing a requested LBS.

In these embodiments, location client 110 may contact HLS 132 on the U1 interface with request 202 and HLS 132 directs the request 204 to VLS 122. HLS 132 knows the IP address of VLS 122 due to prior roaming agreements between a home network service provide (H-NSP) (i.e., H-CSN 108) and the visiting NSP (i.e., V-CSN 106). HLS 132 may optionally provide a response back on the U1 interface to location client 110 indicating that mobile station 102 is roaming.

In these embodiments, V-AAA 124 contacts H-AAA 134 using subscriber profile and security query 208 to authenticate the incoming LBS request. The user profile in H-AAA 134 may include the devices' location determination capabilities and security options. In some embodiments, the user profile may include support for GPS for each device, support of enhanced WiMAX location capability for each device, and subscription to LBS (levels/types).

In accordance with some embodiments, subscriber profile and security query 206 may be generated by VLS 122 once at a beginning of a roaming session. Subscriber profile and security query 208 may be forwarded by V-AAA server 124 to the H-AAA server 134 once at the beginning of the roaming session. In these embodiments, once V-AAA 124 obtains the subscriber profile and security credentials from the H-AAA 134 of the visiting mobile station that is requesting a LBS, V-AAA 124 may be configured to cache this information locally until the user's roaming session is terminated.

In some embodiments, in response to receipt of subscriber profile and security query 208 from V-AAA server 124, home AAA server 134 may be configured to authenticate the request and provide security policy information for visiting mobile station 102 to V-AAA 124.

In some embodiments, HLS 132 and H-AAA 134 may operate in H-CSN 108, VLS 122 and V-AAA 124 may operate in V-CSN 106. In these embodiments, H-CSN 108 is a home network for the visiting mobile station 102 when visiting mobile station 102 is roaming in a service area served by an access service network (ASN) 104 of the V-CSN 106.

In some embodiments, procedure 200 may include providing accounting update message 222 from VLS 122 to an accounting server 126 operating in the V-CSN 106 when the location data response message 218 is sent to the HLS 132.

In some embodiments, when location data request 202 is received at HLS 132, HLS 132 identifies VLS 122 from subscriber identification information provided by location client 110 (i.e., an IP address, network identifier or other identifier). HLS 132 may forward location data request 202 to the identified VLS 122.

In some alternate embodiments, before forwarding location data request message 204 to VLS 122, HLS 132 may contact H-AAA 132 for the subscriber profile. HLS 132 may receive the subscriber profile from H-AAA 132 and provide it to VLS 122 along with location data request message 204. This may allow the subscriber profile, which includes subscriber capabilities, to be stored in VLS 122 rather than in H-AAA 134. Accordingly, subscriber profile and security query 206 generated by VLS 122 and subscriber profile and security query 208 forwarded by V-AAA 124 would not need to include a query for the subscriber profile since the subscriber profile is already stored in V-AAA 124.

In some embodiments, when home AAA server 134 authenticates request 202, VLS 122 may be configured to determine whether or not visiting mobile station 102 has a standalone location capability. When VLS 122 determines that the visiting mobile station 102 does not have standalone location capability, a location controller (such as location controller 116) is identified in operation 210 within one of ASNs 104 for the visiting mobile station 102, and location report request message 212 may be sent from the VLS 122 to the identified LC 116 to request the location information. Location data response message 218 may be generated to include the location information. Location data response message 218 may be sent to HLS 132 for forwarding as location data response message 220 to location client 110. Location data response message 218 may be sent in response to receipt of location report response 216 from LC 116.

In some embodiments, in response to receipt of location report request message 212, LC 116 may generate the location information using a network based technique, such as from location measurements performed by base stations 114. In these embodiments, operation 214 may be performed which may include performing a location estimation process in the network access provider (NAP), which may include ASN 104.

When VLS 122 determines that visiting mobile station 102 includes standalone location capability, operations of procedure 300 (FIG. 3) discussed below, may be performed.

Figure 3:
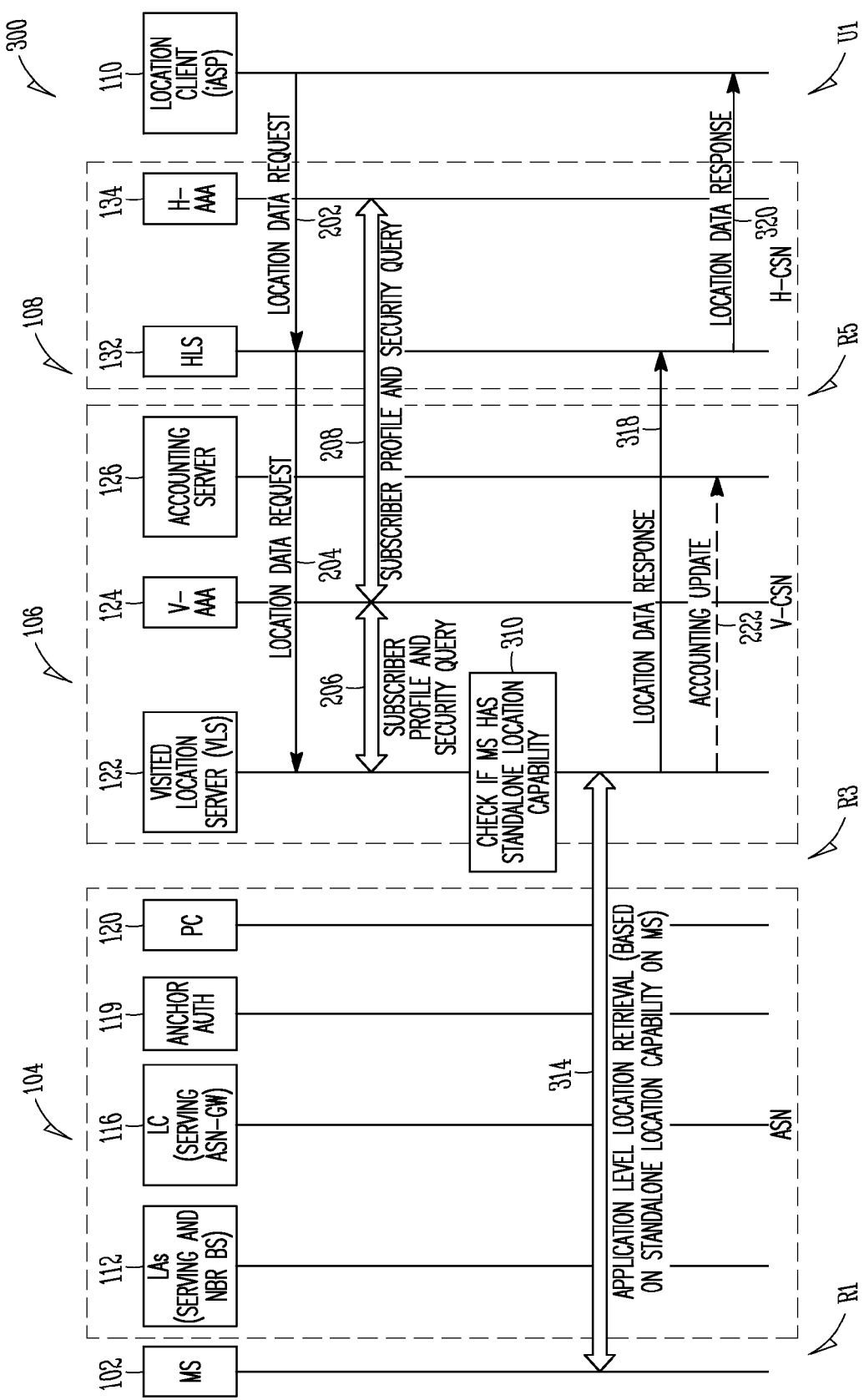
FIG. 3 illustrates a procedure for providing LBS when a mobile station is roaming in accordance with some other embodiments.

FIG. 3 illustrates a procedure for providing LBS when a mobile station is roaming in accordance with some other embodiments. In accordance with procedure 300, a request for LBS for a roaming mobile station is authenticated, location information for the roaming mobile station is determined and provided to the application service provider, and user policies from H-CSN are applied to the services. In the embodiments illustrated in FIG. 3, mobile station 102 uses a standalone location determining capability and a network-based location determining technique is not needed. Operations of procedure 300 having like reference numbers to those of procedure 200 (FIG. 2) may correspond to identical operations.

In these embodiments, VLS 122 may determine whether or not visiting mobile station 102 includes standalone location capability in operation 310. When visiting mobile station 102 includes standalone location capability, VLS 122 may perform an application level retrieval of location information with visiting mobile station 102 in operation 314. Location data response message 318 may be generated by VLS 122 to include the location information. VLS 122 may send location data response message 318 to HLS 132 for forwarding to location client 110. In these embodiments, the standalone location capability within visiting mobile station 102 may include a GPS receiver, although other standalone location determining capabilities may also be included. When visiting mobile station 102 has standalone location capability, LC 116 of ASN 104 is bypassed.

In some embodiments, location server 122 may include an interface configured to receive location data request 202 forwarded by home location server 132 for visiting mobile station 102. Location server 122 may also include software-configured circuitry to generate subscriber profile and security query 206 for forwarding from V-AAA server 124 to H-AAA server 134 in response to location data request 204. The software-configured circuitry may be configured to obtain location information for visiting mobile station 102 when H-AAA server 134 authenticates the request and to send location data response message 318 that includes the location information to HLS 132 for forwarding to location client 110 as location data response message 320 to location client 110 for use in performing the requested LBS.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of providing a location based service (LBS) in a wireless access network to a visiting mobile station, the method comprising:
   receiving at a visited location server (VLS) a location data request forwarded by a home location server (HLS), the location data request originating from a location client; and
   generating a subscriber profile and security query for forwarding from a visitor authentication server to a home authentication server at a beginning of a roaming session,
   when the home authentication server authenticates the location data request, the method includes obtaining location information for the visiting mobile station and sending a location data response message that includes the location information from the VLS to the HLS for forwarding to the location client for use by the location client in performing a requested LBS, and
   wherein in response to the subscriber profile and security query, security policy information for the visiting mobile station is provided to the visitor authentication server.

2. The method of claim 1 wherein the subscriber profile and security query is generated by the VLS at the beginning of the roaming session.

3. The method of claim 2 wherein in response to receipt of the subscriber profile and security query from the visitor authentication server, the home authentication server is configured to authenticate the request and provide the security policy information for the visiting mobile station to the visitor authentication server.

4. The method of claim 1 wherein the HLS and the home authentication server operate in a home core-service network (H-CSN),
   wherein the VLS and the visitor authentication server operate in a visitor core-service network (V-CSN),
   wherein the H-CSN is a home network for the visiting mobile station, and
   wherein the visiting mobile station is roaming in a service area served by an access service network (ASN) of the V-CSN.

5. The method of claim 4 further comprising providing an accounting update message from the VLS to an accounting server operating in the V-CSN when the location data response message is sent to the HLS.

6. The method of claim 1 wherein when the location data request is received at the HLS, the HLS identifies the VLS from subscriber identification information provided by the location client, and
   wherein the HLS forwards the location data request to the identified VLS.

7. The method of claim 1 when the home authentication server authenticates the request, the method includes determining by the VLS whether or not the visiting mobile station has a standalone location capability,
   wherein when the VLS determines that the visiting mobile station does not have standalone location capability, the method includes:
   identifying a location controller (LC) within one of a plurality of access service networks (ASNs) for the visiting mobile station;
   sending a location report request message to the identified LC to request the location information; and
   generating the location data response message that includes the location information and sending the location data response message to the HLS for forwarding to the location client.
   wherein the location data response message is sent in response to receipt of a location report response from the LC.

8. The method of claim 7 wherein in response to receipt of the location report request message, the LC generates the location information from location measurements performed by base stations of one of the ASNs.

9. The method of claim 7 wherein when the VLS determines that the visiting mobile station includes standalone location capability, the method includes:
   performing by the VLS, an application level retrieval of location information with the visiting mobile station;
   generating the location data response message that includes the location information and sending the location data response message to the HLS for forwarding to the location client.

10. The method of claim 1 wherein the visiting mobile station operating within an access service network requests a location-based service through an internet application service provider (iASP),
    wherein the iASP, operating as the location client, generates the location data request and sends the location data request to the HLS associated with the visiting mobile station.

11. The method of claim 10 wherein the ASN is a broadband wireless access network that comprises two or more base stations for communicating with the visiting mobile station using orthogonal frequency division multiple access (OFDMA).

12. The method of claim 1 wherein a public-safety answering point (PSAP) generates the location data request in response to a request from the visiting mobile station operating in an access service network (ASN), and
    wherein the PSAP sends the location data request to the HLS associated with the visiting mobile station.

13. A location server configured to operate in a core service network as a visiting location server (VLS) for a visiting mobile station, the location server comprising:
    an interface configured to receive a location data request forwarded by a home location server (HLS) for the mobile station; and
    software-configured circuitry to generate a subscriber profile and security query for forwarding from a visitor authentication server to a home authentication server at a beginning of a roaming session in response to the location data request,
    wherein the software-configured circuitry is further configured to obtain location information for the visiting mobile station when the home authentication server authenticates the request and to send a location data response message that includes the location information to the HLS for forwarding to a location client for use in performing a requested LBS, and wherein in response to the subscriber profile and security query, security policy information for the visiting mobile station is provided to the visitor authentication server.

14. The location server of claim 13 wherein in response to receipt of the subscriber profile and security query from the visitor authentication server, the home authentication server is configured to authenticate the request and provide the security policy information for the visiting mobile station to the visitor authentication server.

15. The location server of claim 13 wherein the subscriber profile and security query is generated at the beginning of the roaming session.

16. The location server of claim 15 wherein the software-configured circuitry is configured to determine whether or not the visiting mobile station has a standalone location capability, wherein when the visiting mobile station does not have standalone location capability, the software-configured circuitry of the location server is configured to:

identify a location controller (LC) within one of a plurality of access service networks (ASNs) for the visiting mobile station;

send a location report request message to the identified LC to request the location information; and generate the location data response message that includes the location information and sending the location data response message to the HLS for forwarding to the location client, wherein the location data response message is sent in response to receipt of a location report response from the LC.

17. The location server of claim 16 wherein when the VLS determines that the visiting mobile station includes standalone location capability, the software-configured circuitry of the location server is configured to:

perform an application level retrieval of location information with the visiting mobile station;

generate the location data response message that includes the location information and sending the location data response message to the HLS for forwarding to the location client.

18. A method to configure a location server to operate in a core service network as a visiting location server (VLS) for a visiting mobile station, the method comprising:

receiving a location data request forwarded by a home location server (HLS) for the mobile station at a beginning of a roaming session; and generating a subscriber profile and security query for forwarding from a visitor authentication server to a home authentication server in response to the location data request;

obtaining location information for the visiting mobile station when the home authentication server authenticates the request; and sending a location data response message that includes the location information to the HLS for forwarding to a location client for use in performing a requested LBS, wherein in response to the subscriber profile and security query, security policy information for the visiting mobile station is provided to the visitor authentication server.

19. The method of claim 18 wherein the subscriber profile and security query is generated at the beginning of the roaming session.

20. The method of claim 18 wherein in response to receipt of the subscriber profile and security query from the visitor authentication server, the home authentication server is configured to authenticate the request and provide the security policy information for the visiting mobile station to the visitor authentication server.

* * * * *

UNITED STATES PATENT AND TRADEMARK OFFICE
CERTIFICATE OF CORRECTION

| | |
|---|---|
| PATENT NO. | : 8,064,928 B2 |
| APPLICATION NO. | : 12/201048 |
| DATED | : November 22, 2011 |
| INVENTOR(S) | : Muthaiah Venkatachalam |

It is certified that error appears in the above-identified patent and that said Letters Patent is hereby corrected as shown below:

On the face page, in field (56), under "Other Publications", in column 2, line 5, delete "Netwolrk" and insert -- Network --, therefor.

On the face page, in field (56), under "Other Publications", in column 2, line 6, delete "MUTISERVICE" and insert -- MULTISERVICE --, therefor.

On the face page, in field (56), under "Other Publications", in column 2, line 8, delete "19-2 1." and insert -- 19-21. --, therefor.

In column 8, line 18, in Claim 7, delete "client." and insert -- client, --, therefor.

In column 9, line 18, in Claim 16, delete "claim 15" and insert -- claim 13 --, therefor.

Signed and Sealed this
Twenty-fourth Day of January, 2012

David J. Kappos
*Director of the United States Patent and Trademark Office*